US012579463B2

(12) United States Patent
Cornelio et al.

(10) Patent No.: US 12,579,463 B2
(45) Date of Patent: Mar. 17, 2026

(54) GENERATIVE REASONING FOR SYMBOLIC DISCOVERY

(71) Applicants: International Business Machines Corporation, Armonk, NY (US); RENSSELAER POLYTECHNIC INSTITUTE, Troy, NY (US)

(72) Inventors: Cristina Cornelio, Kilchberg (CH); Ruixuan Yan, Troy, NY (US); Vasily Pestun, Newmarket, NH (US); Lior Horesh, North Salem, NY (US)

(73) Assignees: ASSI International Business Machines Corporation, Armonk, NY (US); Rensselaer Polytechnic Institute, Troy, NY (US)

( * ) Notice: Subject to any disclaimer, the term of this patent is extended or adjusted under 35 U.S.C. 154(b) by 967 days.

(21) Appl. No.: 17/062,058

(22) Filed: Oct. 2, 2020

(65) Prior Publication Data

US 2022/0108205 A1 Apr. 7, 2022

(51) Int. Cl.
*G06N 20/00* (2019.01)
*G06N 5/04* (2023.01)

(52) U.S. Cl.
CPC .............. *G06N 20/00* (2019.01); *G06N 5/04* (2013.01)

(58) Field of Classification Search
CPC ................................. G06N 5/04; G06N 20/00
See application file for complete search history.

(56) References Cited

U.S. PATENT DOCUMENTS

| | | |
|---|---|---|
| 7,805,386 B2 | 9/2010 | Greer |
| 10,311,442 B1 | 6/2019 | Lancaster |

OTHER PUBLICATIONS

Schmidt, Michael, and Hod Lipson. "Distilling free-form natural laws from experimental data." (2009) science 324.5923: 81-85. (Year: 2009).*
Mcllraith, Sheila, et al. "Towards diagnosing hybrid systems." (1999) Working Notes of the AAAI 1999 Spring Symposium Series: Hybrid Systems and AI. (Year: 1999).*
Pidaparti, Ramana M. "Structural corrosion health assessment using computational intelligence methods." (2007) Structural Health Monitoring 6.3: 245-259. (Year: 2007).*

(Continued)

*Primary Examiner* — Michael J Huntley
*Assistant Examiner* — Maggie Thanh Maido
(74) *Attorney, Agent, or Firm* — Caleb Wilkes; Otterstedt & Kammer PLLC

(57) ABSTRACT

Provide a background theory applicable to a scientific problem as input to a computerized generative reasoner, which in turn produces a plurality of provable conjectures applicable to the problem, based on the input. Provide the plurality of provable conjectures and a set of input training data to a computerized model inference engine, which fits the input training data to the plurality of provable conjectures to obtain at least one candidate symbolic model reflecting scientific laws associated with the problem. Reduce a search space of a computerized prediction module by providing to the computerized prediction module at least one candidate symbolic model. Provide new data to the computerized prediction module, which searches in the reduced search space to make a prediction related to the problem based on the new data and the at least one candidate symbolic model.

19 Claims, 13 Drawing Sheets

(56) References Cited

OTHER PUBLICATIONS

Urban, Josef, Jiří Vyskočil, and Petr Štěpánek. "MaLeCoP machine learning connection prover." (Jul. 4-8, 2011) Automated Reasoning with Analytic Tableaux and Related Methods: 20th International Conference, TABLEAUX 2011, Bern, Switzerland, Proceedings 20. Springer Berlin Heidelberg. (Year: 2011).*

Meier, Men-Andrin, et al. "Reliable real-time seismic signal/noise discrimination with machine learning." (2019) Journal of Geophysical Research: Solid Earth 124.1: 788-800. (Year: 2019).*

Xun, G., Jha, K., Gopalakrishnan, V., Li, Y., & Zhang, A. (2017, November). Generating medical hypotheses based on evolutionary medical concepts. In 2017 IEEE International conference on data mining (ICDM) (pp. 535-544). IEEE. (Year: 2017).*

Marino, K., Fergus, R., Szlam, A., & Gupta, A. (2020, June). Empirically verifying hypotheses using reinforcement learning. arXiv preprint arXiv:2006.15762. (Year: 2020).*

Lin, Z., Jain, A., Wang, C., Fanti, G., & Sekar, V. (2019, September). Generating high-fidelity, synthetic time series datasets with doppelganger. arXiv preprint arXiv:1909.13403. (Year: 2019).*

Mehrabi et al., A survey on bias and fairness in machine learning. arXiv preprint arXiv:1908.09635. Aug. 23, 2019. 31 Pages.

Roscher et al., Explainable machine learning for scientific insights and discoveries. IEEE Access, pp. 42200-42216, Feb. 2020.

Fayyad et al., From data mining to knowledge discovery in databases. AI magazine, 17(3), pp. 37-54, Mar. 1996.

Anonymously, IP.com: Discovery of How Real-World Events Influence Application Usage Characteristics, Apr. 16, 2019. pp. 6.

Anonymously, IP.com Enhance Quality of Matching Systems by Applying Fuzzy Logic and Neural Network Learning Techniques (or Machine Learning Techniques), Oct. 22, 2018, pp. 8.

Anonymously, IP.com, A Method for Learning Logical Classification Rules Using Column Generation, Jun. 4, 2020, 8 pages.

Aygun, E.; Learning to Prove from Synthetic Theorems. 2020. pp. 18 arXiv:2006.11259v1 [cs.LO] Jun. 19, 2020.

Cai, L.; and Wang, W. Y. 2017. Kbgan: Adversarial learning for knowledge graph embeddings. arXiv preprint arXiv:1711.04071 Apr. 16, 2018 11 pages.

Cornelio, C.; and Thost, V. RuDaS: Synthetic Datasets for Rule Learning and Evaluation Tools. 2019. pp. 12 arXiv:1909.07095v2 [cs.AI] Feb. 12, 2020.

De Cao, N.; and Kipf, T. 2018. MolGAN: An implicit generative model for small molecular graphs. arXiv preprint arXiv:1805.11973 Sep. 27, 2022 13 pages.

Estruch, V.; 2005. Distance Based Generalisation. In Proc. of ILP. Springer-Verlag. ISBN 3-540-28177-0, 978-3-540-28177-1 16 pages.

Estruch V, Ferri C, Hernández-Orallo J, Ramírez-Quintana MJ. An integrated distance for atoms. In Functional and Logic Programming: 10th International Symposium, FLOPS 2010, Sendai, Japan, Apr. 19-21, 2010. Proceedings 10 2010 (pp. 150-164). Springer Berlin Heidelberg. E.

Irving, G.; 2016. Deepmath-deep sequence models for premise selection. In Advances in Neural Information Processing Systems, 2235-2243.

Kaliszyk, C.; Chollet, F.; and Szegedy, C. Holstep: A machine learning dataset for higher-order logic theorem proving. arXiv preprint arXiv:1703.00426. 2017. pp. 12 Mar. 1, 2017.

Karpathy, A. 2015. The Unreasonable Effectiveness of Recurrent Neural Networks. retrieved Mar. 20, 2024 from URL http://karpathy.github.io/2015/05/21/rnn-effectiveness/. pp. 31 original post May 21, 2015.

Kucik, A. S.; and Korovin, K. 2018. Premise selection with neural networks and distributed representation of features. arXiv preprint arXiv:1807.10268 10 pages Jul. 26, 2018.

Nienhuys-Cheng, S.-H. Distance Between Herbrand Interpretations: A Measure for Approximations to a Target Concept. In Inductive Logic Programming, vol. 1297. Springer. 1997. pp. 14.

Polu, S.; and Sutskever, I. Generative Language Modeling for Automated Theorem Proving. 2020. pp. 20 arXiv:2009.03393v1 [cs.LG] Sep. 7, 2020.

Preda, M. 2006. Metrics for Sets of Atoms and Logic Programs. Annals of the University of Craiova 33: 67-78.Jul. 15, 2005.

Rabe, M. N.; Lee, D.; Bansal, K.; and Szegedy, C. Mathematical Reasoning via Self-supervised Skiptree Training. 2020. pp. 19 arXiv:2006.04757v3 [cs.LG] Aug. 12, 2020.

Seda, A. K.; and Lane, M. On continuous models of computation: Towards computing the distance between (logic) programs. In Proc. of IWFM. 2003. pp. 13.

Singher, E.; and Itzhaky, S. Theory Exploration Powered By Deductive Synthesis. 2020. pp. 23 arXiv:2009.04826v2 [cs.PL] Nov. 25, 2021.

Urban, J.; and Jakubuv, J. First Neural Conjecturing Datasets and Experiments. In Intelligent Computer Mathematics. CICM 2020. Springer. pp. 9 arXiv:2005.14664v1 [cs.AI] May 29, 2020.

Wang, M.; and Deng, J. 2020. Learning to Prove Theorems by Learning to Generate Theorems. arXiv preprint arXiv:2002.07019. pp. 12 34th Conference on Neural Information Processing Systems (NeurIPS 2020), Vancouver, Canada. 2020.

Wang, M.; Tang, Y.; Wang, J.; and Deng, J. 2017. Premise selection for theorem proving by deep graph embedding. In Advances in Neural Information Processing Systems, 2786-2796.

M. Mittal, H. Bel, Variational Autoencoders: A Brief Survey. 2018 pp. 9.

Z. Pan, et al. Recent progress on generative adversarial networks (GANs): A survey. 2019. pp. 12 IEEE Access Received Feb. 21, 2019, accepted Mar. 10, 2019, date of publication Mar. 14, 2019, date of current version Apr. 2, 2019. Digital Object Identifier 10.1109/ACCESS.2019.2905015.

A. Oussidi, A. Elhassouny. Deep generative models: Survey. 2018. pp. 9 In2018 International conference on intelligent systems and computer vision (ISCV) Apr. 2, 2018 (pp. 1-8 plus cover). IEEE.

G. Marra, et al. Constraint-Based Visual Generation. 2019. pp. 13 arXiv:1807.09202v3 [cs.LG] Sep. 24, 2019.

Crouse, Maxwell, et. al. High Fidelity Vector Space Models of Structured Data, arXiv preprint arXiv: 1901.02565, 2019). pp. 15. Jan. 15, 2019.

Peter Mell and Timothy Grance, The NIST Definition of Cloud Computing, NIST Special Publication 800-145, cover, pages i-iii, 1-3, Sep. 2011.

* cited by examiner

*FIG. 5*

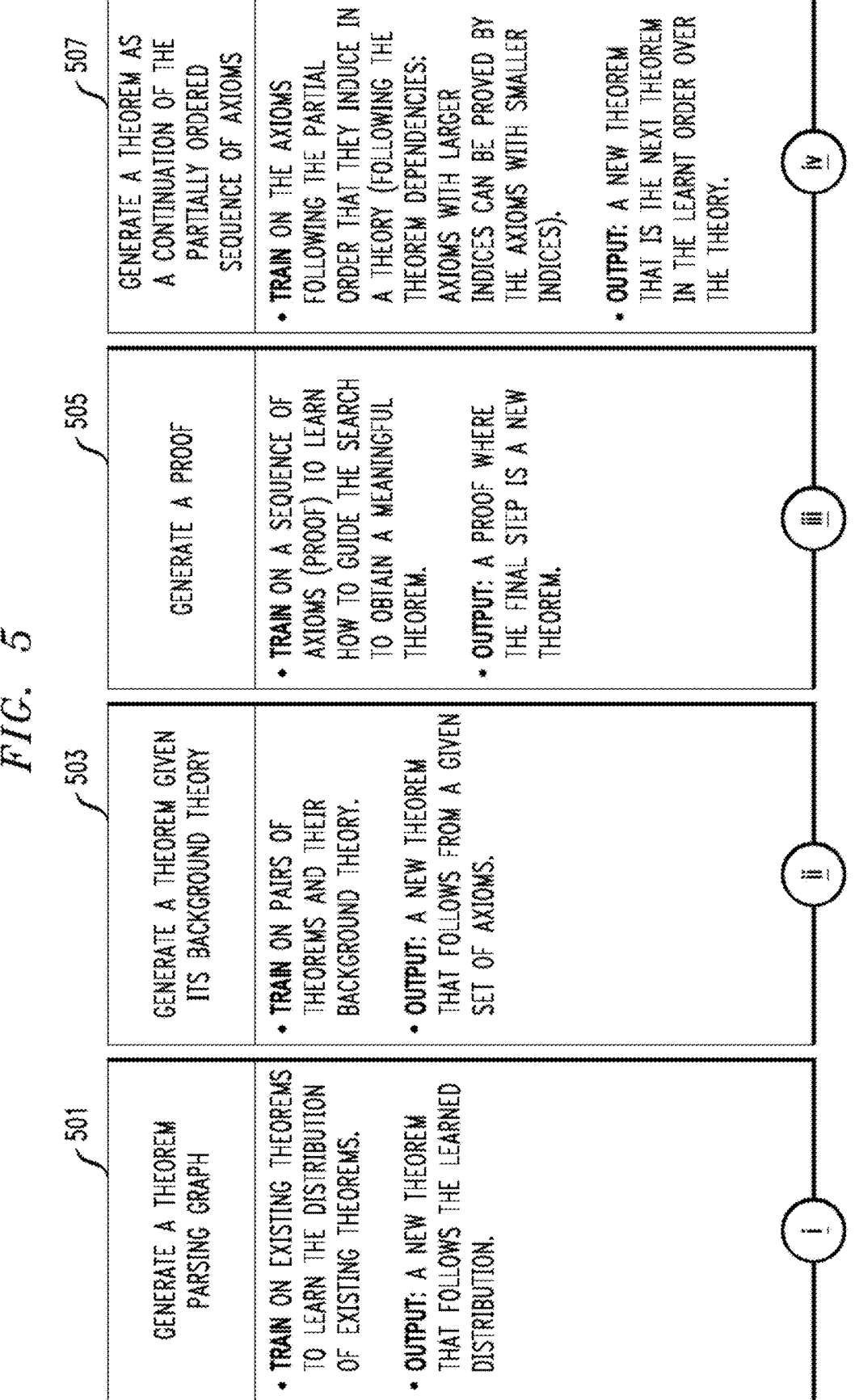

501

GENERATE A THEOREM PARSING GRAPH

* TRAIN ON EXISTING THEOREMS TO LEARN THE DISTRIBUTION OF EXISTING THEOREMS.

* OUTPUT: A NEW THEOREM THAT FOLLOWS THE LEARNED DISTRIBUTION.

i

503

GENERATE A THEOREM GIVEN ITS BACKGROUND THEORY

* TRAIN ON PAIRS OF THEOREMS AND THEIR BACKGROUND THEORY.

* OUTPUT: A NEW THEOREM THAT FOLLOWS FROM A GIVEN SET OF AXIOMS.

ii

505

GENERATE A PROOF

* TRAIN ON A SEQUENCE OF AXIOMS (PROOF) TO LEARN HOW TO GUIDE THE SEARCH TO OBTAIN A MEANINGFUL THEOREM.

* OUTPUT: A PROOF WHERE THE FINAL STEP IS A NEW THEOREM.

iii

507

GENERATE A THEOREM AS A CONTINUATION OF THE PARTIALLY ORDERED SEQUENCE OF AXIOMS

* TRAIN ON THE AXIOMS FOLLOWING THE PARTIAL ORDER THAT THEY INDUCE IN A THEORY (FOLLOWING THE THEOREM DEPENDENCIES; AXIOMS WITH LARGER INDICES CAN BE PROVED BY THE AXIOMS WITH SMALLER INDICES).

* OUTPUT: A NEW THEOREM THAT IS THE NEXT THEOREM IN THE LEARNT ORDER OVER THE THEORY.

iv

*FIG. 9*
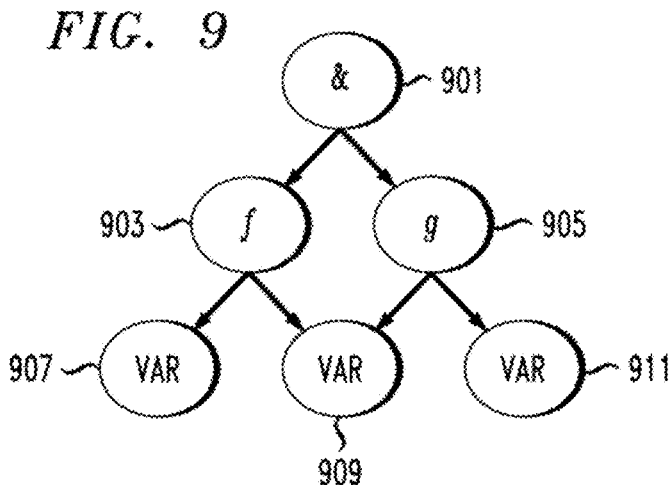
*FIG. 10A*
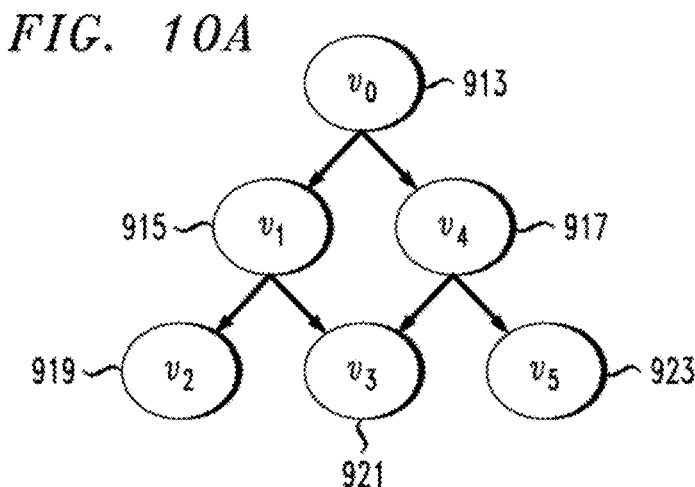
*FIG. 10B*
$$e_{v_1}^{t+1} = F_P^t(e_{v_1}^t + \frac{1}{3} [F_I^t(e_{v_1}^t, e_{v_0}^t) + F_O^t(e_{v_1}^t, e_{v_2}^t)F_O^t(e_{v_1}^t, e_{v_3}^t)])$$

| NODE TYPE | NODE TYPE OF ACTION SET |
|-----------|-------------------------|
| & | &, \|, ~, =, PRED |
| \| | &, \|, ~, =, PRED |
| ~ | PRED, = |
| = | FUNC, VAR, CONST |
| PRED | FUNC, VAR, CONST |
| FUNC | FUNC, VAR, CONST |

FIG. 13

ALGORITHM 1 RL ALGORITHM OF GENERATOR

1: Initialize the root node $v_0$ by random sampling and compute its child number $c_0$, initialize $t = 0$, initialize the set of nodes in the graph $V_t = \{v_0\}$ 2: repeat

3:    Choose the node with the minimum number of children to be selected as expanding node $v_e$ 4:    Compute the embedding of current graph as $s_t$, and compose the action set according to the type of $v_e$ 5:    Compute the probability distribution of actions using the policy network, and sample an action $a_t$ as a candidate node $v_c$ 6:    if $v_c \in V_t$ and $v_c = v_i$ then

7:       Build an edge between $v_e$ and $v_i$

8:    else

9:       Set $v_{t+1} = v_c$, and $V_t = V_t \cup v_{t+1}$

10:       Build an edge between $v_e$ and $v_{t+1}$

11:    end if

12: until No node in the graph needs to expand

Figure 15:
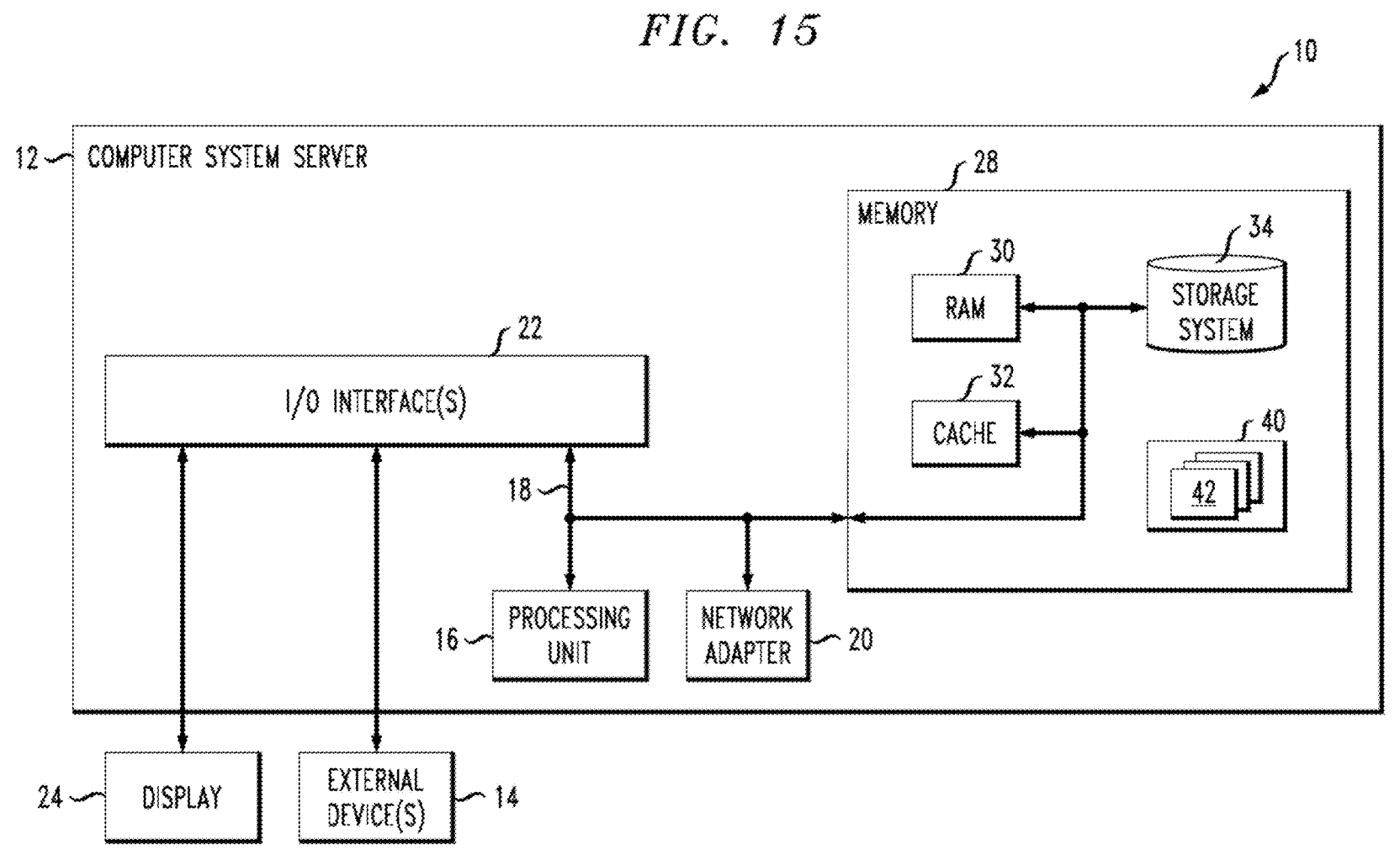

COMPUTER SYSTEM SERVER

10

12

28

MEMORY

34
STORAGE SYSTEM

30
RAM

32
CACHE

40

42

18

22
I/O INTERFACE(S)

20
NETWORK ADAPTER

16
PROCESSING UNIT

14
EXTERNAL DEVICE(S)

24
DISPLAY

GENERATIVE REASONING FOR SYMBOLIC DISCOVERY

BACKGROUND

The present invention relates to the electrical, electronic and computer arts, and more specifically, to artificial intelligence (AI), machine learning, and the like.

The design of mathematical models for representation of a process or phenomenon is ubiquitous in science and engineering. Currently, automated discovery of such models from data either resorts to parametric regression methods (of a predetermined functional form), or otherwise resorts to symbolic regression approaches, which attempt to infer both the functional form and the underlying parameterization.

In either case of current automated model discovery, the extraction of the model from the data is not derivable, even when the functional form of the model is explicitly extracted and not embedded in the model.

SUMMARY

Principles of the invention provide techniques for generative reasoning for symbolic discovery. In one aspect, an exemplary method includes providing a background theory applicable to a scientific problem as input to a computerized generative reasoner; with the computerized generative reasoner, producing a plurality of provable conjectures applicable to the scientific problem, based on the input to the computerized generative reasoner; providing the plurality of provable conjectures and a set of input training data to a computerized model inference engine; with the computerized model inference engine, fitting the input training data to the plurality of provable conjectures to obtain at least one candidate symbolic model reflecting scientific laws associated with the scientific problem; reducing a search space of a computerized prediction module by providing to the computerized prediction module the at least one candidate symbolic model; providing to the computerized prediction module new data; and with the computerized prediction module, searching in the reduced search space to make a prediction related to the scientific problem based on the new data and the at least one candidate symbolic model.

In another aspect, an exemplary apparatus includes a memory; a non-transitory computer readable medium including computer executable instructions; and at least one processor, coupled to the memory and the non-transitory computer readable medium, and operative to execute the instructions to be operative to instantiate a computerized generative reasoner, a computerized model inference engine, and a computerized prediction module; provide a background theory applicable to a scientific problem as input to the computerized generative reasoner; with the computerized generative reasoner, produce a plurality of provable conjectures applicable to the scientific problem, based on the input to the computerized generative reasoner; provide the plurality of provable conjectures and a set of input training data to the computerized model inference engine; with the computerized model inference engine, fit the input training data to the plurality of provable conjectures to obtain at least one candidate symbolic model reflecting scientific laws associated with the scientific problem; reduce a search space of a computerized prediction module by providing to the computerized prediction module the at least one candidate symbolic model; provide to the computerized prediction module new data; and with the computerized prediction module, search in the reduced search space to make a prediction related to the scientific problem based on the new data and the at least one candidate symbolic model.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

increased correctness and robustness of models;

reduced search space as compared to prior art which reduces required number of CPU cycles need to carry out modelling, as compared to prior art approaches;

greater ability to generalize as compared to prior art;

increased acceptability due to increased insight and ability to explain relation to underlying physical laws;

more scalable than prior art due to reduced search space.

These and other features and advantages of the present invention will become apparent from the following detailed description of illustrative embodiments thereof, which is to be read in connection with the accompanying drawings.

BRIEF DESCRIPTION OF THE DRAWINGS

FIG. 5 depicts generative reasoning tasks employed in connection with one or more embodiments;

FIG. 9 shows an exemplary directed acyclic graph representation, useful with aspects of the invention;

FIG. 10A and FIG. 10B show exemplary details of updating a node embedding, useful with aspects of the invention;

FIG. 11 shows an exemplary generator learning process, according to an aspect of the invention;

FIG. 12 is a table of exemplary classification of action sets using nodes' type(s), according to an aspect of the invention;

FIG. 13 is pseudo-code of an exemplary algorithm of a generator, according to an aspect of the invention;

FIG. 14 is an example of a model policy network, according to an aspect of the invention; and FIG. 15 depicts a computer system that may be useful in implementing one or more aspects and/or elements of the invention, also representative of a cloud computing node according to an embodiment of the present invention.

DETAILED DESCRIPTION

Figure 1:
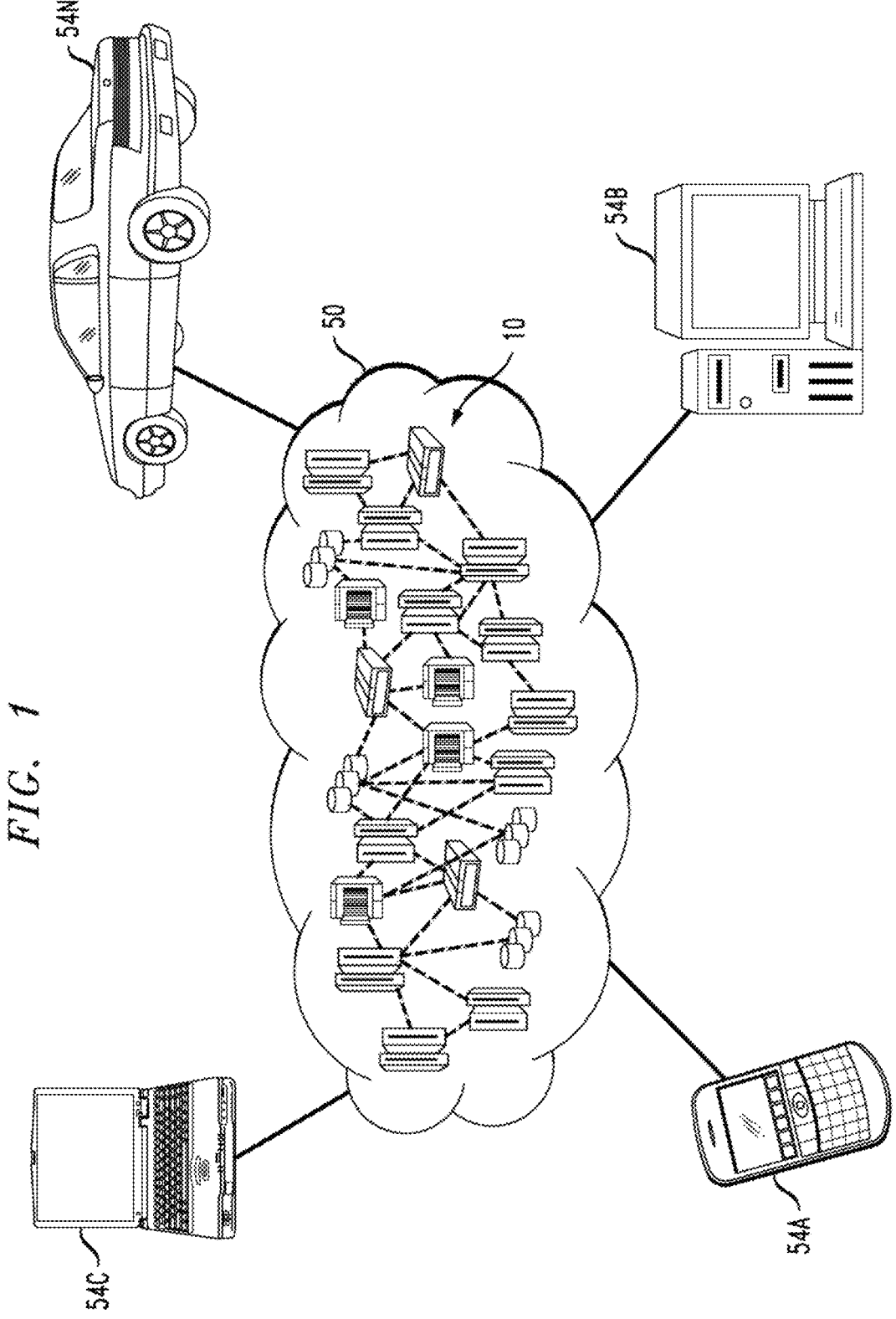
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
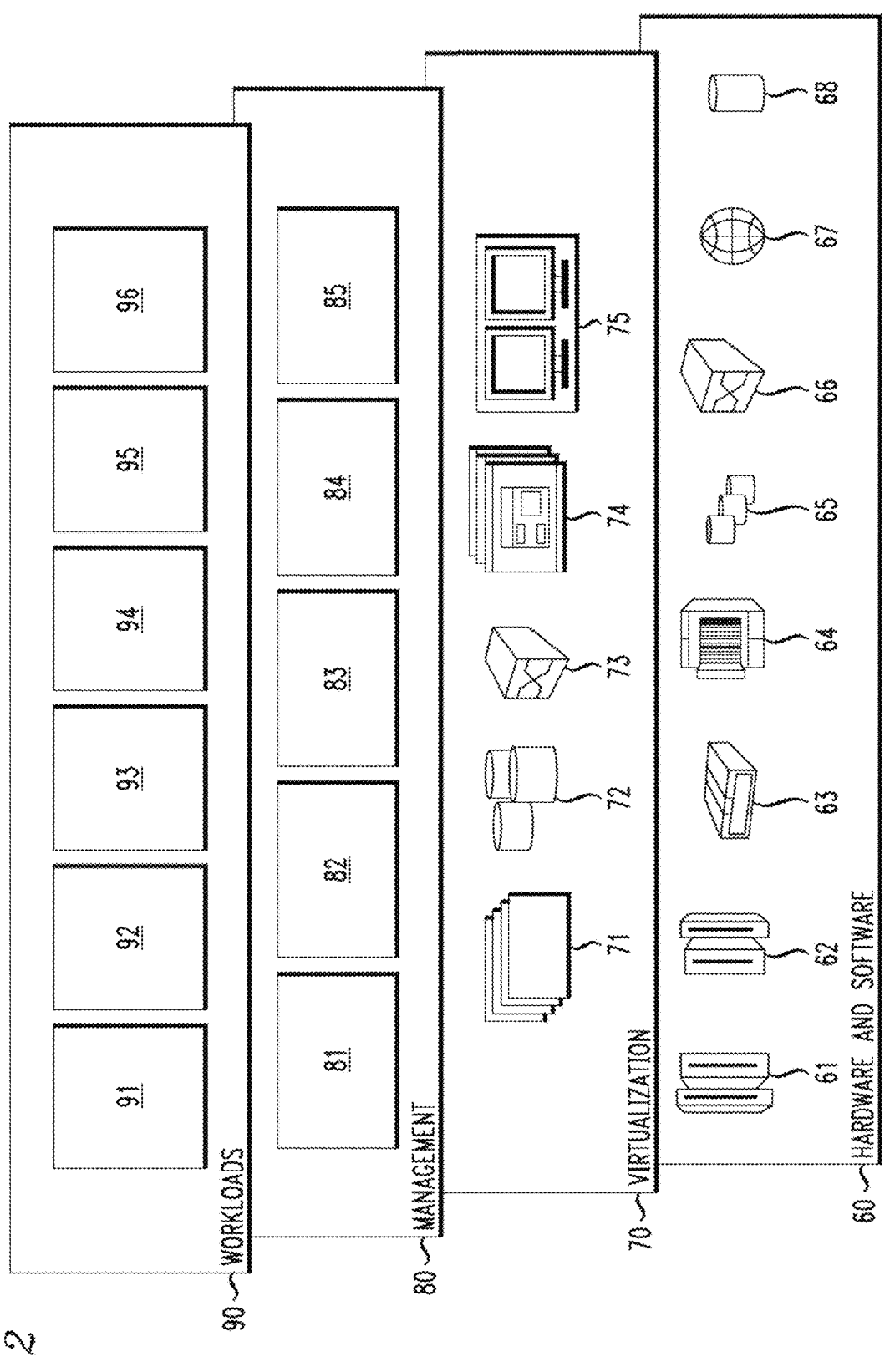
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a cloud-based service 96 (or one or more elements thereof) to facilitate generative reasoning for symbolic discovery.

As noted, the design of mathematical models for representation of a process or phenomenon is ubiquitous in science and engineering. Currently, automated discovery of such models from data either resorts to parametric regression methods (of a predetermined functional form), or otherwise resorts to symbolic regression approaches, which attempt to infer both the functional form and the underlying parameterization. In either case of current automated model discovery, the extraction of the model from the data is not derivable, even when the functional form of the model is explicitly extracted and not just embedded in the model.

The ability to discover models that are derivable has several appeals:

1. correctness and robustness—it enables ruling out models that may equally (or even better) fit the data, yet are not consistent with the background knowledge and beliefs about the domain problem;

2. generalizability—there are otherwise an infinite number of models that can map a set of input data points to a set of output data points, yet they may often fail to offer good prediction of out-of-set instances (especially if there is little support around the query datum)—one or more embodiments permit distinguishing among this large number of potential models;

3. insight and explainability—it is easier to get human acceptance of a new insight regarding the underlying process or phenomena under investigation when it is possible to show from established background theory (e.g. a set of consensus axioms, or first principles) that the relation is derivable;

4. scalability—comprehensive account for all grammatically plausible (yet not derivable) functional forms is combinatorically intractable for complex models. Furthermore in this regard, in one or more embodiments, scalability is ensured by restricting the search space. One way is to use the grammar (so restrict the search space to grammatically well-formed formulas—yet not derivable). Another way is the introduction of constraints (for example it is known that that the formula at 0 has to be equal to 0—so the function passes through the origin). Another way (that is the generative reasoning) is to restrict the search space to only derivable formulas. One or more embodiments advantageously combine all these aspects, so that the outputs are well-formed derivable formulas.

One or more embodiments address the problem of principally deriving/explaining the fundamental laws (e.g. of physics, mathematics, etc.) that are behind a formula that fits with the numerical data. One or more embodiments advantageously combine symbolic discovery with generative reasoning, applying generative models to reasoning to enhance the symbolic discovery process.

One or more embodiments advantageously address the unification of explicit symbolic model extraction from numerical data with formal reasoning. One or more embodiments incorporate the mechanisms to extract models from numerical datasets with logic systems in an end-to-end architecture. This integration can provide a restriction of the search space, i.e. can generate a set of formally derivable formulas to provide as input to a component that tries to fit the data minimizing the error (such restriction helps ensure verification capabilities). Specifically, one or more embodiments address this generative reasoning capability. Indeed, one or more instances apply generative approaches to theorem proving datasets to be able to generate new "nice" theorems from a given theory (set of axioms), where "nice" corresponds to compact, novel, consistent and human understandable.

One or more embodiments interconnect numerical methods for model discovery with reasoning. Many potential models can provide accurate predictions for a given dataset; one or more embodiments search for models that adhere to the conventional model discovery criteria (e.g. minimal complexity, bounded prediction error, etc.), but restrict the search space to a set of derivable symbolic models (derivable from a background theory) hypothesized using a generative reasoning engine.

A generative reasoning engine takes as input a given set of axioms and suggests new conjectures (possibly with associated probabilities or real values defining confidence scores). These new conjectures belong to the input theory and belong to the distribution of derivable theorems. The output can be used, for example, to produce a set of theorems that can then be evaluated by a numerical system on the input data (but use is not restricted to such applications). The generative method can be implemented, by way of example and not limitation, as variational auto-encoders (VAE) or generative adversarial networks (GANs).

System Pipeline Description

Figure 3:
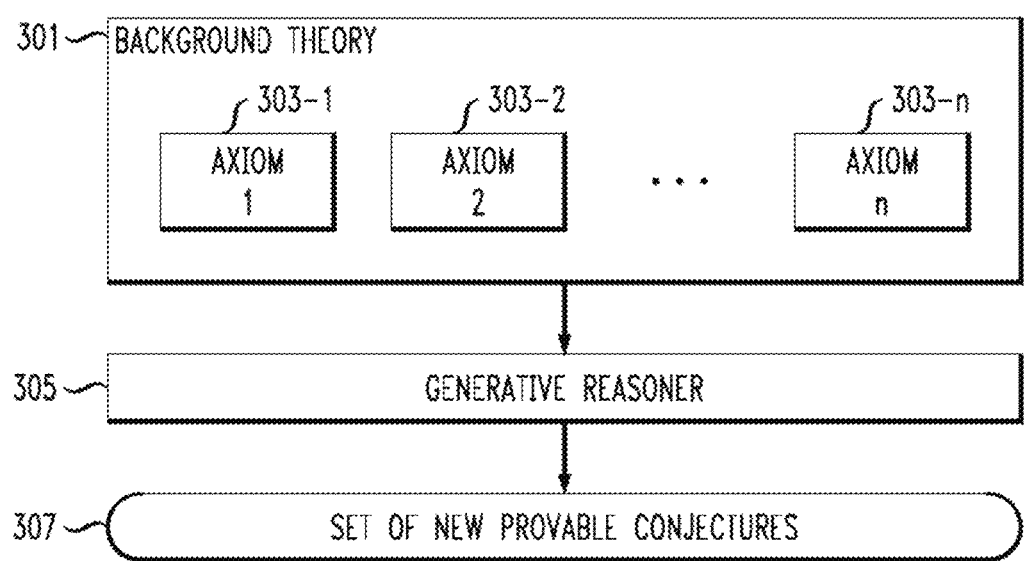
FIG. 3 depicts generative component capabilities, according to an aspect of the invention.
Figure 4:
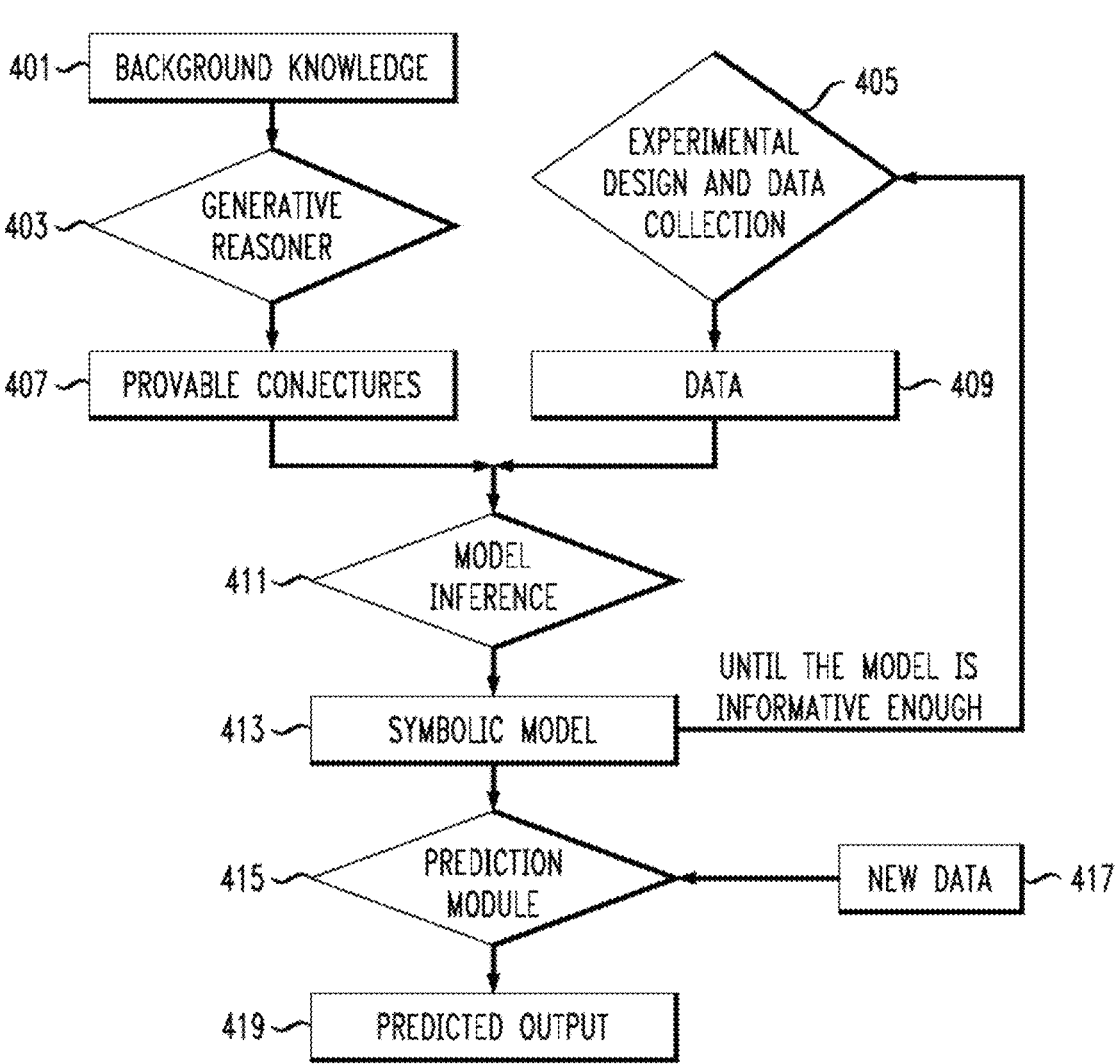
FIG. 4 depicts a system overview, according to an aspect of the invention.

Referring to FIG. 4, an exemplary system starts from two modules. A first module 405 collects the input data 409: this can be done by designing a specific experiment to generate input and output data of interest, or collecting or measuring data in a non-experimental setting. Referring also to FIG. 3, a second, generative module 305, 403 takes as input a background theory 301, 401 (i.e. a set of axioms 303-1, 303-2, . . . , 303-$n$) and produces a set of symbolic models/ formulas 307, 407. In one or more embodiment the new conjectures are provable/derivable, ensuring consistency with the background theory (note, however, that this is not necessarily true in every embodiment; for example, when using neural methods this cannot be ensured (or the output of the neural network can be restricted to be derivable)). That is to say, given a set of axioms (background theory) it is desired to produce novel theorems that can be induced by the axioms. This reduces the search space for the model inference component 411 (which would otherwise include the whole set of grammatically well-formed formulas). Examples of a background theory include, for example, conservation of energy, conservation of mass, definition of a kinetic force from mechanics, and the like. Thus, an exemplary physical context is the case where, given known laws regarding a phenomenon, it is desired to discover new meaningful laws that can be derived by it. In FIG. 4, diamond-shaped elements 403, 405, 411, and 415 are procedures while the remaining rectangular elements are data.

A simplified illustrative example may be of value to the skilled artisan. Without using aspects of the invention, one might, for example, fit a high-order polynomial to data and obtain good correlation with the data within the domain of the data. However, outside the domain of the data to which the high-order polynomial was fit, nuisance values might be obtained. Using aspects of the invention, an "educated guess" can be made, based on the laws of physics, chemistry, or the like, as to the functional form of the data (e.g., exponential or logarithmic). An exponential, logarithmic, sine, or cosine function, in some non-trivial embodiment, (for example—as opposed to generic, pre-determined activation function) might then be fit to the data that would reflect the underlying physics or chemistry, and be expected to provide meaningful results even outside the domain of the data/outside the training set. One or more embodiments enable identification of a rich and flexible set of possible functional forms, based on the underlying background knowledge.

Once the data 409 and the set of provable formulas 407 are collected, they are provided as input to the model inference component 411. This component seeks to fit the data to the provable symbolic models 407, obtaining one or more candidate symbolic models 413. This process (i.e. 405, 409, 411, and 413) is repeated until a formula that is informative enough is produced; notice the logical flow from 413 to 405. Moreover, it is possible to also generate more formulas (steps 401, 403, 407) if it is seen that an informative model cannot be reached after many iterations. To determine whether the formula is sufficiently informative, for example, model risk concepts can be employed to quantify, through different dimensions, the risk of deciding that a certain model is the correct one. Model risk typically considers fidelity (closeness of predictions to correct value(s)) and complexity (wherein more complicated models are considered as riskier and may be subject to overfitting). Another aspect of model risk considers whether the model is provable/derivable. Risk management of artificial intelligence (AI) and machine learning (ML) models will be familiar to the skilled artisan, who, given the teachings herein, will be able to apply suitable heuristics, and/or model risk concepts, to determine whether the formula is sufficiently informative in a given case.

The model inference component 411 can include, for example, formulating a mixed-integer nonlinear optimization problem which is solved with available software (and optionally optimizing other dimensions such as the compactness of the formula and the like). One non-limiting example of suitable software is BARON (the Branch-and-Reduce Optimization Navigator), a complete and robust solver for global optimization of nonconvex optimization problems, available from The Optimization Firm, LLC, Atlanta, Georgia, USA.

Once the candidate symbolic models 413 are generated, they are provided as input to be used in the prediction module 415. The prediction module takes as input new (or unseen before) data 417 and produces new predictions (outputs) 419. This process can involve, for example, splitting of the data (into training and testing data) or for example, in the corrosion problem discussed elsewhere herein, train the model on experimental data, and the new data comes from real-world data from the airplane facility.

Consider a concrete example of the pipeline in the context of detection of corrosion on airplanes exposed to rain and other atmospheric conditions (such as proximity to the sea, sunlight, humidity, and the like). The experimental design module 405 designs an experiment (exposing the metal in a controlled environment with specific conditions) to collect the data 409. The collected data is provided as input to the model inference module 411 along with a set of suitable formulas 407 generated by the generative reasoner 403 from a set of axioms 401 known about the physics (such as the Butler-Volmer equation, Tafel equation, conservation laws, and the like). Once these two components (data 409 and possible formulas 407) are provided, the model inference module 411 will try to fit the data into the formulas, finding the best symbolic model that minimizes the error. The symbolic model 413 is then provided to the prediction module 415 which, given the current atmospheric conditions, is able to anticipate the starting of the corrosion process and communicate same to airplane facility personnel, allowing them to apply a preventive cover and/or to move the airplanes (e.g. to an environmentally controlled area with suitable temperature and/or humidity) and to thus avoid or at least mitigate the starting of the corrosion process on the airplanes' metal parts. This is also explainable since it provides insight into why the phenomenon is happening (because the model is derived from first principles).

Furthermore regarding experimental design module 405, in one aspect, in a laboratory, a small section (say, a few centimeters) of metal is placed in a controlled environment (such as a box in which water and/or steam can be injected, the metal can be sprayed with salt, and so on). The experimental design module decides which data to collect; for example, how much salt/water and the like to add to the box, and how many times to repeat the experiment and under which conditions. For example, utilize an information-theoretic measure such as mutual information (information gain) to quantify the expected reduction in uncertainty and derive experimental data points to be utilized. Try to find new points that will maximize the divergence of the predictions between two models. One or more embodiments employ adaptive experimental design. The skilled artisan, given the teachings herein, will be able to apply suitable heuristics, and/or experimental design concepts, to design appropriate experiments in a given case.

Elements 403, 405, 411, 415 in FIG. 4 correspond to; e.g., high-level computer code which is compiled or interpreted into machine-executable code stored in non-volatile memory and implemented on at least one hardware processor. Element 405 is discussed immediately above. Element 403 can include, for example, a learning module, such as an MLP, as discussed elsewhere herein. Element 415 can include, for example, a solver such as MATLAB® software, available from The MathWorks, Inc., Natick, MA, USA, or the like. Model inference element 411 can include, for example, BARON software as discussed elsewhere herein.

Tasks Description—Generative Reasoning

The generative reasoning module 403 solves different problems fulfilling the same goal of generating new theorems 407 given a set of axioms 401. In one or more embodiments, and referring also to FIG. 5, four different tasks are addressed:

(i) generate the theorem: In this task, only train on existing theorems to learn their distribution. The output is a new theorem that follows the learned distribution. Referring to element 501 in FIG. 5, one or more embodiments generate a theorem parsing graph by training on existing theorems in order to learn the distribution of existing theorems, and then output a new theorem that follows the learned distribution. For example the parsing graph (a concept for natural language that will be familiar to the skilled artisan) that represents a formula for the expression "1+2," can be represented by a tree in which "+" will be the root node of the graph and "1" and "2" are the two child nodes.

(ii) generate the theorem and background theory (set of axioms): Each existing theorem has a set of axioms used to prove it. In this task, train on pairs of theorems and their background theory to generate a new pair including: (i) theorem and (ii) associated background theory (the set of axioms that are necessary to prove that theorem). Thus, referring to element 503 in FIG. 5, one or more embodiments generate a theorem, given its background theory, by training on pairs of theorems and their associated background theory, outputting a new theorem that follows from a different set of axioms.

(iii) generate the proof: In this task, learn how to generate a theorem by generating its proof. Thus, train on a sequence of axioms (the proof) to learn how to guide the search in the proof space to obtain a meaningful new theorem that will correspond to the final step of the proof. The skilled artisan will be familiar with the concept of generating a theorem by generating its proof based on references such as Wang, Mingzhe, and Jia Deng, "Learning to Prove Theorems by Learning to Generate Theorems," arXiv preprint arXiv: 2002.07019, 2020 Feb. 17; and Aygün, Eser, Zafarali Ahmed, Ankit Anand, Vlad Firoiu, Xavier Glorot, Laurent Orseau, Doina Precup, and Shibl Mourad, "Learning to Prove from Synthetic Theorems," arXiv preprint arXiv:2006.11259, 2020 Jun. 19 (hereinafter Wang et al. and Aygün et al., respectively). Referring to element 505 in FIG. 5, one or more embodiments train on a sequence of axioms (proof) to learn how to guide the search to obtain a meaningful theorem, and output a proof where the final step is a new theorem; i.e., the output is not the theorem itself but a sequence of steps, the last step of which is the theorem. Given the teachings herein, the skilled artisan will be able to adapt known techniques for generating a theorem by generating its proof to implement one or more embodiments.

(iv) generate the theorem as a continuation of the partially ordered sequence of axioms: In every logical theory, the axioms have a partial order. Axioms with larger indices can be proved by the axioms with smaller indices. Thus, arrange a theorem and its background theory as a sequence of data. In this task, aim to learn to generate a theorem exploiting this order. Referring to element 507 in FIG. 5, one or more embodiments train on the axioms following the partial order that they induce in a theory (following the theorem dependencies: axioms with larger indices can be proved by the axioms with smaller indices), and output a new theorem that is the next theorem in the learned order over the theory; i.e. a continuation of the sequence.

In what follows, exemplary embodiments are set forth for the generative tasks mentioned above. Indeed, three possible embodiments, for tasks (i), (ii), and (iv) are set forth (their descriptions are in FIGS. 6, 7, and 8, respectively). Elements 501, 503, 505, 507 are thus different ways to accomplish the same end; task (iii) can be accomplished by adapting known techniques, such as from Wang et al. and Aygün et al., given the teachings herein.

Formula Representation

The formula can be represented in graph form by its parsing graph. A graph can be embedded in different ways: the graph can be represented by an adjacency matrix, or using an invertible function. The skilled artisan will be generally familiar with such concepts from, for example, Crouse, Maxwell, Achille Fokoue, Maria Chang, Pavan Kapanipathi, Ryan Musa, Constantine Nakos, Lingfei Wu, Kenneth Forbus, and Michael Witbrock, "High-Fidelity Vector Space Models of Structured Data," arXiv preprint arXiv: 1901.02565, 2019 Jan. 9. Otherwise, an alternative way is to use a reinforcement learning (RL) approach to generate a linearization of a graph using the grammar. This approach is believed to be more efficient, as it is not necessary to learn the grammar as well.

Embodiments of the invention are not limited to the graph representation of a formula; an example of an alternative representation includes treating the formula as a sequence of words (tokens).

Figure 6:
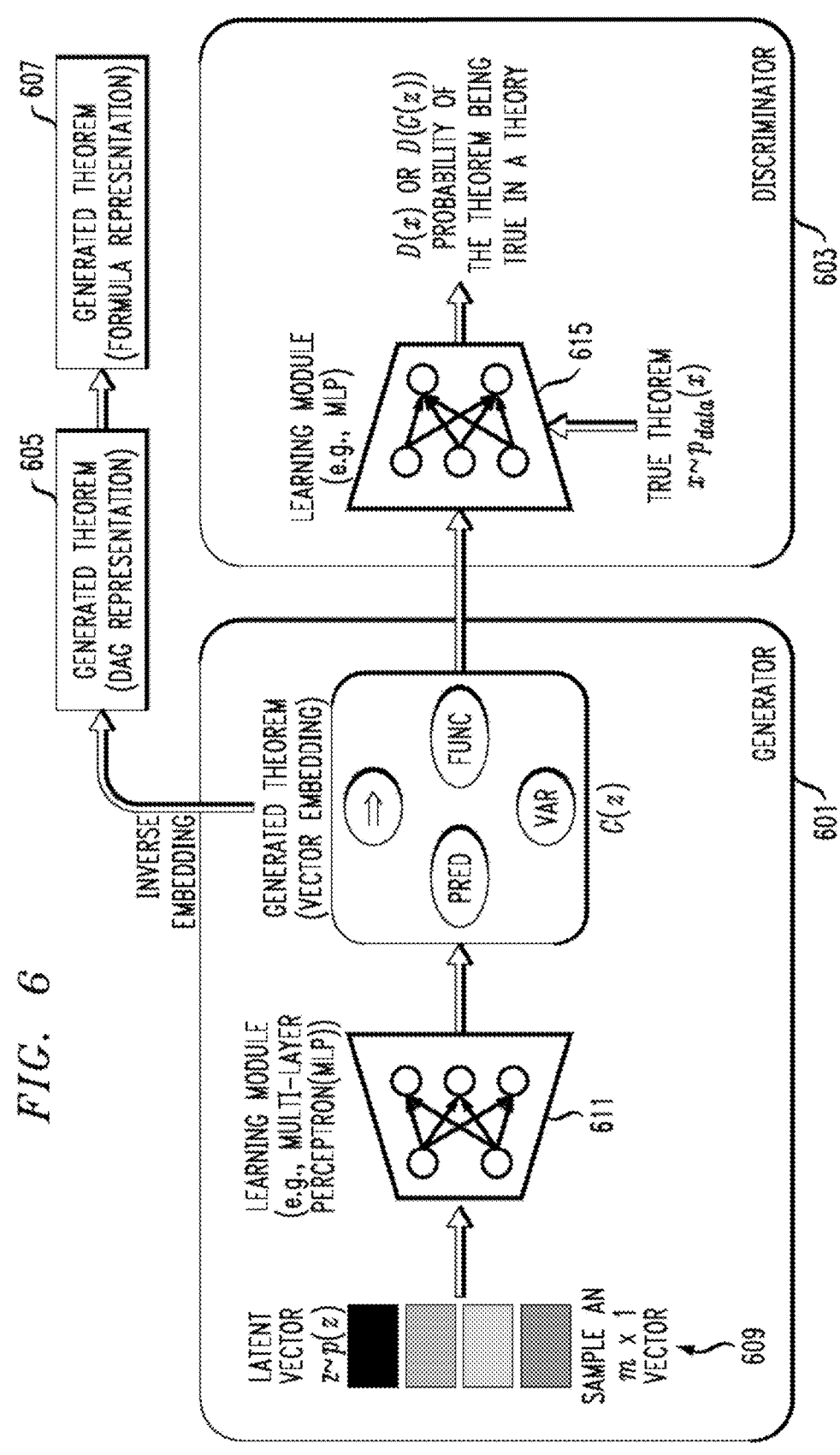
FIG. 6 shows specifics of generating a theorem parsing graph, according to an aspect of the invention.

Task (i) generating the theorem: Referring to FIG. 6, one exemplary embodiment for Task (i) uses GANs. The generator 601 produces the graph embedding of a new theorem, and the discriminator 603 takes a graph embedding as input and computes the probability that the input theorem is true. Suppose that x represents the graph embeddings of existing theorems, and z represents a latent variable whose distribution is known—see 609. The generator 601 generates embeddings of a new theorem through $y=G(z)$, as seen at 613, using a learning module such as a multi-layer perceptron (MLP) 611. The discriminator (e.g. MLP learning module 615 thereof) takes the embedding of a theorem (existing or generated) and computes the probability that the theorem is true. The discriminator tries to maximize D(x) to be as close to 1 as possible and minimize D(y) to be as close to 0 as possible. The generator tries to maximize D(y) to be as close to 1 as possible. To recover the graph representation of a new theorem from its embedding, an invertible function embedding technique is used; note the inverse embedding leading to a directed acyclic graph (DAG) representation of the generated theorem at 605 and a formula representation thereof at 607. This task thus only trains on existing theorems to learn their distribution. The output is a new theorem that follows the learned distribution. In one or more embodiments (e.g. FIGS. 6 and 7), the discriminator D takes as input the original theorem x and the generated theorem y. Element G is the generator.

Figure 7:
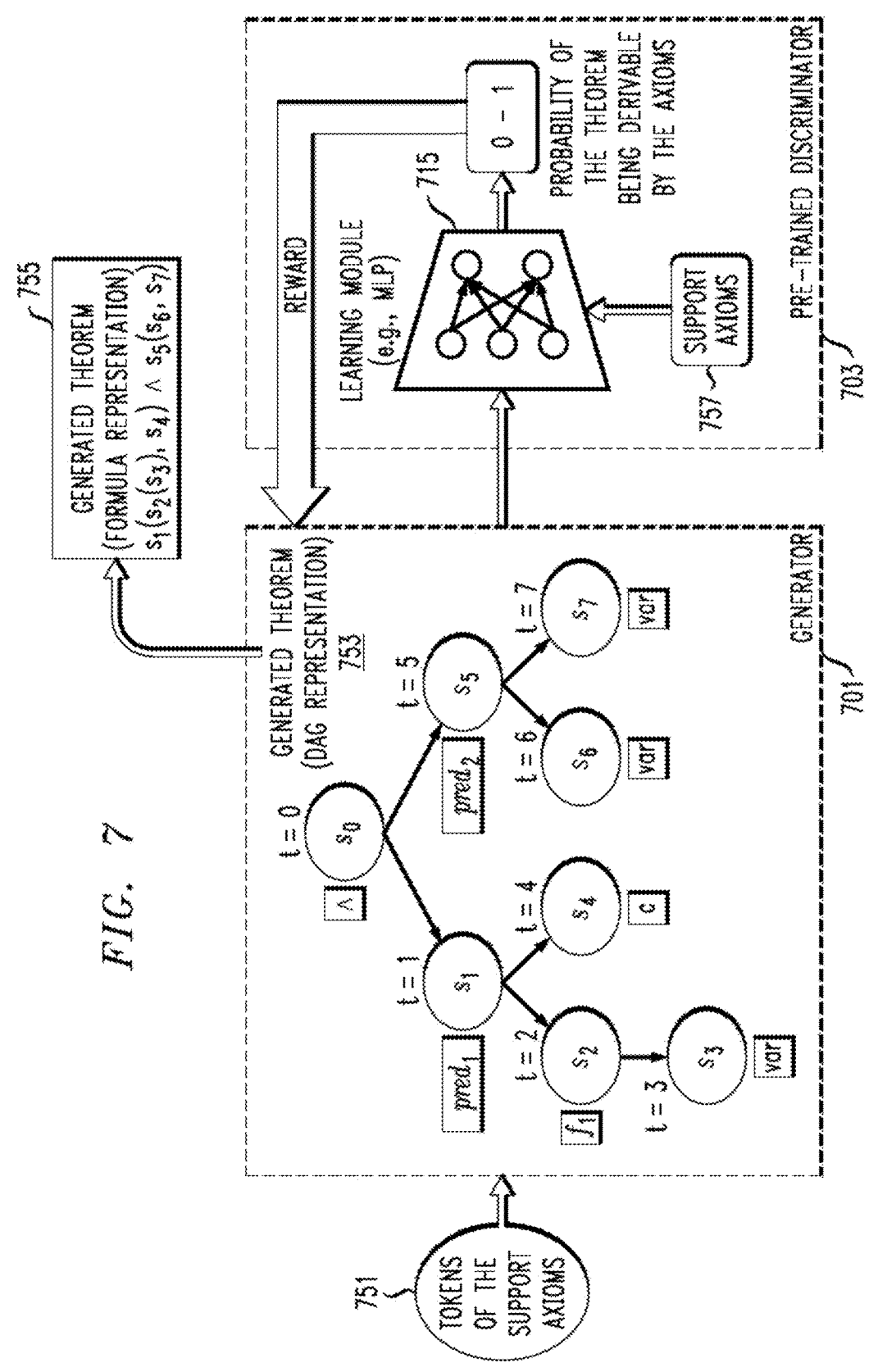
FIG. 7 shows specifics of generating a theorem given its background theory, according to an aspect of the invention.

Task (ii) generating the theorem and background theory (set of axioms): Referring to FIG. 7, Task (ii) can be solved with the architecture for Task (i), with the additional input of a background theory (tokens of the support axioms 751, 757). Additionally, one or more embodiments employ a reinforcement learning (RL) method. In this task, an exemplary embodiment uses an approach that is similar to a GAN. However, the method to generate new theorems is different from Task (i), and the discriminator 703 is a pre-trained model that uses a learning module such as MLP (Multi-Layer-Perceptron) 715. Specifically, the discriminator is a pre-trained classifier that classifies positively if given the combination of a conjecture with its supports axioms (axioms used to prove the conjecture or positive axioms) and negatively if given the combination of a conjecture and axioms that are not used in its proof (negative axioms). It is desired to determine whether a set of axioms can prove a given theorem; i.e., is the theorem derivable by the axioms (solving the satisfiability problem). The discriminator is thus an approximation of a theorem prover. The tokens 751 appearing in the set of axioms of an existing theorem are used as the input of the generator 701. The generator adopts an RL algorithm (REINFORCE, ACT, etc.) to generate a new theorem by constructing the graph of the new theorem, where at each time step, one node (an action) of the graph is sampled. Moreover, utilize the grammar of the considered logic (e.g. first-order FOL, higher order logic HOL, etc.) while sampling an action; for example, considering FOL, if the current state is a predicate which has a child to be sampled, the admissible action set is the set of functions and constants appearing in the background theory and variables. After the graph representation of a new theorem is constructed (DAG representation 753), perform the embedding of the new theorem. The discriminator 703 takes the embedding of a new theorem and outputs the probability of the new theorem being true, which is the reward of the generator. Through iterative training, the generator 701 learns to generate a meaningful theorem 753 that is then converted in its formula representation 755. A pertinent advantage of one or more embodiments is that an invertible embedding is not needed, because the graph representation 753 of a new theorem is directly obtained from the generator, while the discriminator only needs the embedding of a new theorem. The parsing graph in generator 701 is the graph of the formula in box 755. Note the conjunction operator Λ.

Task (iv) generating the theorem as a continuation of the partially ordered sequence of axioms: Considering that there is a partial order between the axioms in logical theory, and referring to FIG. 8, treat an existing theorem and its support axioms as a sequence of data, which is similar to the video or textual data (in the sense that it is a flow of ordered data that has to be considered as a ordered list and not as a set). Thus, a theorem and its background theory can be arranged as a sequence of data. In this task an aim is to learn to generate a theorem exploiting this order. Each axiom in the dataset has a unique index 1, 2, . . . , T, which is the position of the axiom in the partial order that is defined over the background theory. This order is constructed such that axioms with larger indices can only be proved by axioms with smaller indices. Here, one embodiment considers both the generator 801 and the discriminator 803 using the Recurrent Neural Network (RNN) model. Suppose that an existing theorem has position T+1 in the order, meaning that there are T axioms in the background theory 861 before the theorem. The generator 801 takes these T axioms as its input and the output at time step T+1 is considered as the embedding of a new theorem. The theorem embedding (that should be invertible) is then transformed to both the DAG and the formula representation of the theorem at 863. The discriminator takes T axioms as its input for the first T time steps and a ground-truth theorem or a new theorem (see 865) from the generator as its input at time step T+1. The output of the discriminator is a scalar between 0 and 1, indicating that the probability that a theorem follows the sequence of the given axioms, instead of the probability of a new theorem following the distribution of existing theorems. In this task, an invertible function is employed to perform the embedding of theorems, so that the graph representation of a new theorem can be recovered. An invertible embedding function means that the mapping from the theorem to the embedding is invertible; thus, it is possible to apply the inverse function to the embedding to recover the theorem.

One or more embodiments thus provide techniques that synergize model discovery from numerical data and logic reasoning, advantageously reducing the search space of the former by generative reasoning. These techniques can be employed on different types of logic: examples are first order logic (FOL) fragments (e.g. Horn clauses), full FOL with arithmetic, combined with differentiable constraints, or combined with machine learning (for example RL with embeddings for logic formulas), higher order logic (HOL), etc. Furthermore, one or more embodiments provide a generative technique that suggests new logic conjectures starting from a given set of axioms. The technique(s) can be used to produce a set of theorems that can then be evaluated by a numerical system on the input data.

The technique(s) can be employed to solve the task of the generation of new theorems learning the theorem distribution in a theory. It can include a generator that generates new theorems and a discriminator that distinguishes original theorems and synthetic theorems telling whether a new theorem can be proved by a set of axioms.

Still further, the technique(s) can have an embodiment of solving the task of the generation of new theorems from a given set of axioms. This aspect can include a generator and a discriminator: the generator can use RL to generate new theorems by generating their associated graph representations according to the grammar of the logic under consideration. The discriminator solves the satisfiability problem for a given conjecture and set of axioms.

Even further, the technique(s) can solve the task of the generation of new theorems by learning the sequence of theorems in logical theory. An RNN model can be employed for both the generator and the discriminator, so that the generator can learn the partial order between the axioms and generate a new theorem that follows the sequence of the axioms.

One or more non-limiting examples will now be provided, it being understood that the skilled artisan will contemplate many applications given the teachings herein. One or more embodiments relate to the unification of explicit symbolic model extraction from numerical data with formal reasoning. One or more embodiments incorporate the mechanisms to extract models from numerical datasets with logic systems in an end-to-end architecture. This integration can provide a restriction of the search space, i.e. generate a set of formally derivable formulas to provide as input to the component that tries to fit the data while minimizing the error: generative reasoning. One or more embodiments apply generative approaches (e.g. VAE, GANs) to theorem-proving datasets to be able to generate new "nice" theorems from a given theory (set of axioms) where "nice" corresponds to desirable properties such as compactness, consistency and understandability by humans.

Generative reasoning is fundamentally different from inductive reasoning since the latter focuses on finding patterns in the data (data here corresponds to facts that the new rules have to satisfy) while the former is based on an original set of rules generating new formulas that might be true. Rule generation is the neural counterpart of forward deductive reasoning, which learns not only to generate new formulas with the desiderata of being provable but also of being "human-readable" since trained on the set of formulas discovered (and written) by humans that can be deduced from an original set of axioms.

In what follows, it will be instructive to bear in mind Task (ii) above, using RL.

Generative Reasoning (GR) aims to provide a restriction of the search space for a model that tries to fit data into formulas. Given a set of background axioms, it is desired to design a generative model so that it can generate meaningful theorems which are logically consistent with the grammar and can be derived by the background axioms. Refer generally to tasks (i)-(iv) as discussed above.

Many different datasets can be employed in one or more embodiments; for example, one or more datasets including mathematical problems expressed in first order logic (FOL) or in higher order logic (HOL). The data in the example datasets is structured as follows: each data sample is a separate file that contains a conjecture (or target theorem), one or multiple positive background axioms, and an equal number of negative background axioms. The positive background axioms are the axioms that are useful to prove the conjecture, and the negative background axioms are the axioms that are not useful to prove the conjecture. Randomly split the data into six disjoint sets, a training set, a validation set, and a test set for the discriminator, and a training set, a validation set, and a test set for the generator. The training set, validation set, and test set for the discriminator are used to train the discriminator, which is a binary classifier that can tell whether a target theorem can be proved by the background axioms.

DAG Representation of Formulas: In first order logic, a term is either a constant, a variable, or a function on terms, and a formula is either a predicate on one or more terms, or logical operator/s applied to one or more predicates. Moreover, there are quantifiers over variables, including ∀ and ∃ operators, which define the meaning of the variables in the formula. One or more embedding can use CNF (conjunctive normal form) to represent the formulas. In this case the logic elements will be only constants, variables, the logic operators AND, OR and NOT, functions, Skolem functions and predicates. All the formulas are assumed to be universally quantified without free variables.

To embed the formulas into numerical data, choose an embedding approach. The strategy used in one or more embodiments is to convert textual formulas into graph representations, and then convert the graph representations into vector embeddings.

The graph format can be chosen as a rooted directed acyclic graph (DAG), which includes nodes and edges. A DAG is denoted as G={V, E}, and the set of nodes is denoted as V={$v_1$, $v_2$, . . . , $v_n$}, and the set of edges is denoted as E={$e_{ij}$}, where $e_{ij}$=($v_i$, $v_j$) denotes the edge between node $v_i$ and node $v_j$ and the edge is directed from $v_i$ to $v_j$. In one or more embodiments, in the graph representation, the same variables can be represented by a common node, and the different variables use a common label "VAR" so that the embedding of any variable will be the same. This representation strategy simplifies the DAG structure and makes the variables' representation the same and ensure invariance to variable renaming (a well-known logic property). A sample DAG representation of a FOL formula is shown in FIG. 9. In FIG. 9, element 901 is the root node (in this case the "AND" logic operator; elements 903 and 905 are two predicates f and g; and elements 907, 909, 911 are variables. This graph corresponds to the formula: f(X,Y) & g(Y,Z).

Graph Embedding: A pertinent goal is to represent a formula in numerical form, so the formulas are embedded in the form of vectors, i.e., using a vector embedding to represent a formula. One or more embodiments employ the idea of convolution on graphs. Each node in the graph has an associated initial embedding, and then an embedding layer maps nodes' initial embedding(s) to embedding(s) with designed dimension d. The embedding of a node $v_i$ is updated with the embeddings of its neighbors, where the update process is illustrated in FIGS. 10A and 10B. FIG. 10A shows the order ($v_1$, $v_2$, . . . , $v_5$) in which the nodes are generated (following a depth first strategy). Elements $v_0$, $v_1$, $v_2$, $v_3$, $v_4$, $v_5$ are numbered, respectively, as 913, 915, 919, 921, 917, and 923. Equation 925 in FIG. 10B is an example of update of the embedding of node $v_1$ (from time t to time t+1).

If several updates are performed, each node's embedding will contain the information of part of the graph or the whole graph, which depends on the times that the update is performed. A max-pooling layer is applied to the embeddings of all the nodes in the graph to obtain an embedding of the graph.

In one or more embodiments the initial embedding of each node can be adopted as a one-hot encoding of the label of a node. Since all the variables in the graphs have the same label "VAR," they have the same initial embedding. For logical operators, quantifiers, predicates, functions, and constants, each has a unique label so that it has a unique embedding. The update of the embedding of a node, for example $v_i$, is defined as following:

$$e_{v_i}^t = F_P^t\left(e_{v_i}^t + \frac{1}{d_{v_i}}\left[\sum_{(v_i,v_j)\in E} F_I^t(e_{v_i}^t, e_{v_j}^t) + \sum_{(v_i,v_j)\in E} F_O^t(e_{v_i}^t, e_{v_j}^t)\right]\right), \quad (1)$$

In the above, $d_{vi}$ is the number of nodes that are connected with $v_i$, $F_I^t$ and $F_O^t$ are update functions that are applied to incoming neighbors and outgoing neighbors of $v_i$. Through multiple times of update, the embedding of a node in the graph will contain the information of a local or global structure of the graph. The embeddings of all the nodes in the graph are updated at the same time. In one or more embodiments, after the update steps, perform the max-pooling on the embeddings of nodes to obtain the embedding of the graph. There are other types of embeddings that can be used. The embedding of a graph will be given as input of a binary classifier that performs the task of premise selection. Through iterative training, the parameters of update functions and binary classifier are updated, and finally the embedding of nodes and graphs in a dataset can be obtained.

Discriminator: A pertinent purpose of the discriminator is to classify whether a conjecture is derivable from the positive background axioms. Through the discriminator (or another related task as premise selection), the embedding of each node appearing in the dataset can be obtained, as well as the embedding of a graph that represents a formula. Recall that each dataset file contains a conjecture, positive background axioms, and negative background axioms. For the discriminator, consider the combination of a conjecture and its positive background axioms as positive data, and the combination of a conjecture and its negative background axioms as negative data. In one or more embodiments, the embedding of the positive data is a concatenation of embedding of the conjecture and the mean of the embeddings of positive background axioms, and the embedding of the negative data is a concatenation of embedding of the conjecture and the mean of the embeddings of negative background axioms. Instead of concatenation, a big graph can also be created with all the axioms together, or any of a number of other options could be employed. The model of the discriminator includes three fully connected layers that convert the embedding of data into a two-dimensional vector representing the classification label.

Figure 11:
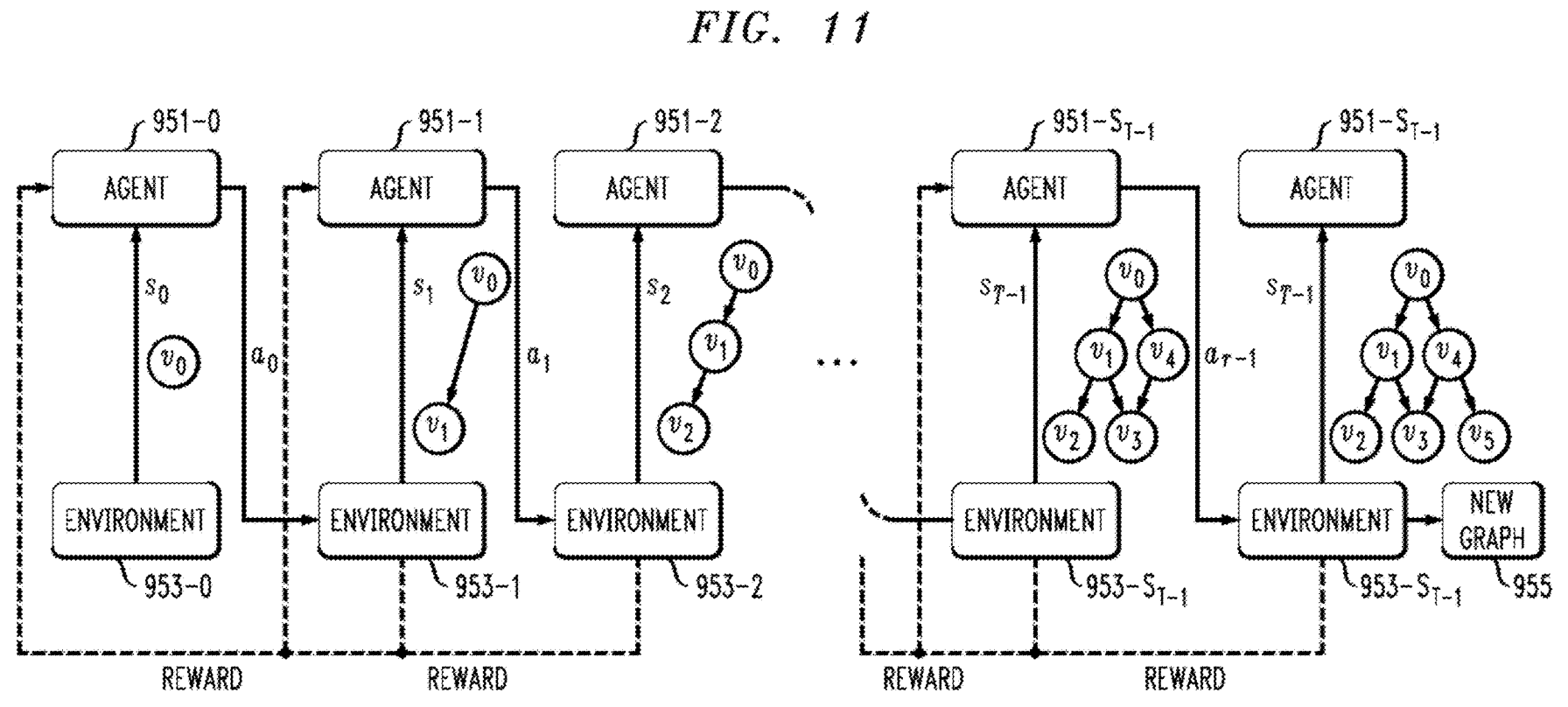

Generator: The generation process is shown in FIG. 11. A pertinent purpose of the generator is to generate new target theorems that can be derived by the given axioms. For the generator, instead of generating the embedding of a theorem, adopt a model that can generate explicitly the graph representation of a theorem. The model utilizes a reinforcement learning (RL) algorithm to construct the graph, where a learning agent learns how to construct a new graph (see element 955 in FIG. 11) that represents a formula which can be derived by the given positive axioms.

The input of the generator includes the set of vocabularies labels included in the positive background axioms (e.g. predicate, functions and constants names). The generator expands the graph by adding a node or edge at each time step 0, 1, 2, . . . , T−1, T, until there is no node that needs to expand. The environment 953-0, 953-1, 953-2, . . . , 953-$S_{T-1}$ tracks the state of the agent, $s_t$, which contains the information of the graph structure at time step t and the actions that have been taken by the agent at each time step 951-0, 951-1, 951-2, . . . , 951-$S_{T-1}$ with corresponding states $S_0$, $S_1$, $S_2$, . . . , $S_{T-1}$. For a state $s_t$, the action set will be different depending on the type of the node that is expanding. If first-order logic is used with CNF, where the formulas are expressed as conjunctions of clauses which are disjunctions of literals (atomic formulas or their negations), all the variables are universally quantified, and the action sets are classified according to the type of nodes. For example, if a node's type is predicate (PRED), then its action set are the vocabularies whose types are function (FUNC), variable (VAR), and constant (CONST). Specifically, the action sets are shown in the table of FIG. 12, where ~ denotes the negation operator. Elements $v_0$, $v_1$, $v_2$, $v_3$, $v_4$, $v_5$ are nodes (that could be logic operators, predicate, functions etc.); the subscripts just indicate the order in which they are generated. They are the same as in FIG. 10A.

During the process of graph generation, utilize a depth-first strategy to build the graph. The root node is randomly selected from &, |, ~, = and PRED included in the positive background axioms. Define that the operators of &, |, =, have two children nodes, and ~ has one child, and the number of children of PRED and FUNC nodes is obtained from the original positive background axioms, which is assumed to be known. VAR and CONST node do not have any children, so they correspond to the leaves nodes. While constructing the graph, the node to expand is the node in the graph that has the minimum number of children nodes to be chosen. This also implements the idea of building the graph with a depth-first strategy. At time step t, the state $s_t$ is considered as the embedding of the graph at t, which is computed with the embedding network in premise selection, and the action set includes the embeddings of available actions.

Figure 14:
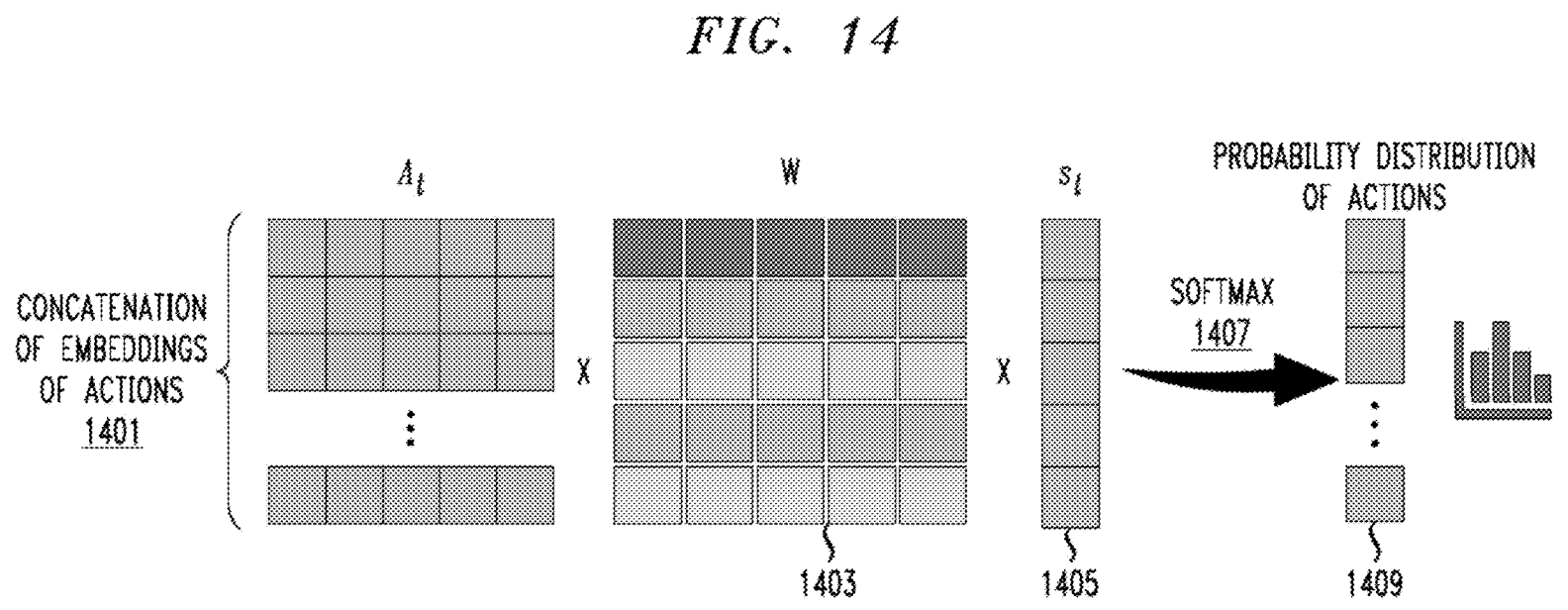

Referring to FIG. 14, given the state $s_t$ 1405 and the action set, define a policy network ("net") that relates these two elements, where the policy net assigns a score for each action in the action set with respect to $s_t$. The purpose of the policy network is to define the probability of choosing an action given the current state. Each action in the action set has a d-dimensional embedding, and the embedding of the current graph is also a d-dimensional vector. To score each action with respect to $s_t$, define the model of the policy network with the following equation:

$$S = A_t W_{S_t} \qquad (2)$$

In the above, $A_t$ is a matrix that is the concatenation 1401 of embeddings of actions, and W 1403 is the parameter that needs to be learned. If the SoftMax of S is taken at 1407, a probability distribution 1409 over the actions can be obtained. The structure of the policy network is shown in FIG. 14. An exemplary reinforcement learning algorithm to construct the graph representation of formulas is depicted in FIG. 13.

The performance of the model was tested.

Evaluation Metrics: We have found that evaluation of the generated theorems is a very challenging problem. Two different evaluation metrics, which we have found to be useful, are described in what follows.

ATP-based evaluation: In this metric, check derivability of the generated theorems using a theorem prover: this is very time consuming (FOL is not even decidable). If a theorem cannot be proven, it can still be correct; the reasoner is just not fast enough. Moreover, for Task (i) it would also be necessary to perform premise selection, because a small set of axioms to use for the proof of a given theorem is not available.

Match-based evaluation: In this metric, check how many of the generated theorems appear in the original data. This is a weaker evaluation metric compared to the ATP-based approach, and not completely accurate from a logic point of view since valid interesting theorems may have been generated but not appear in the original data.

Thus, a new reasoning problem is introduced herein: formula discovery, that is, generating novel formulas from a set of axioms (background theory). Four different tasks, which can solve the formula discovery problem, are disclosed herein. It has been demonstrated herein that reasonable sets of novel theorems can be produced, which are well formed by design (grammatically correct), providing a baseline for the generative reasoning problem.

In addition to the corrosion problem discussed elsewhere herein, another practical application is the detection of structural damage inside buildings/bridges that is not visible from the outside (e.g. damage in the metal pillars inside the concrete of a wall). The data is collected as ultrasounds wave reflection from the material and a determination is made if there is a damage inside of the pillar or not.

In general, prior art techniques have to try all possible formulas, whereas embodiments of the invention limit to a smaller set of provable conjectures; that is, prior art techniques do not include, for example, elements 401, 403, 407 in FIG. 4.

In one or more embodiments, given a pool of formulas, it is desired to generate new formulas (not induce them) that might be true. This is different from logical induction because it is typically not based on data (facts that the new rules have to satisfy) but on an original set of rules. Inductive reasoning is fundamentally different from generative reasoning since the former focuses on finding patterns in the data (data here corresponds to facts that the new rules has to satisfy) while the latter is based on an original set of rules generating new formulas that might be true. Rule generation is the neural counterpart of forward deductive reasoning, that learns to generate new formulas with the desiderata of being provable and being "human-readable" since trained on the set of formulas discovered (and written) by humans that can be deduced from an original set of axioms.

Furthermore, prior art techniques do not include, for example, steps 401, 403, 407 and are therefore slower than embodiments of the invention because steps 401, 403, 407 allow reducing the search space.

Given the discussion thus far, it will be appreciated that, in general terms, an exemplary method, according to an aspect of the invention, includes, at 401, providing a background theory applicable to a scientific problem as input to a computerized generative reasoner 403. The scientific problem could be, but need not be, a physical problem. The background theory typically includes a set of axioms applicable to the scientific problem. The scientific problem can include, for example, a mathematical problem, a biology problem, a chemistry problem, and the like. A further step includes, with the computerized generative reasoner 403, producing a plurality of provable conjectures 407 applicable to the scientific problem, based on the input to the computerized generative reasoner. A still further step includes providing the plurality of provable conjectures and a set of input training data 409 to a computerized model inference engine 411. The input training data can be collected or generated following a specific experimental design. Yet a further step includes, with the computerized model inference engine, fitting the input training data to the plurality of provable conjectures to obtain at least one candidate symbolic model 413 reflecting scientific laws associated with the scientific problem.

Even further steps include reducing a search space of a computerized prediction module 415 by providing to the computerized prediction module the at least one candidate symbolic model; and providing to the computerized prediction module new data 417. This new data includes data not seen before/test data—one or more embodiments train on training data where an answer is known, and then run on test where the answer is not known. Another step includes, with the computerized prediction module 415, searching in the reduced search space to make a prediction related to the scientific problem based on the new data 417 and the at least one candidate symbolic model 413. In this regard, a single candidate symbolic model is believed to be a common case; however, in some circumstances there can be more than one—for example, use a law of Newtonian classical mechanics macroscopically and something else (say, quantum or relativistic) microscopically.

One or more embodiments further include repeating the step of fitting the input data until the at least one candidate symbolic model is sufficiently informative; exemplary techniques to make such a determination are set forth elsewhere herein.

In some cases, the scientific problem includes a physical problem.

One or more embodiments further include mitigating a physical system subject to the physical problem based on the at least one candidate symbolic model. For example, where the physical problem includes corrosion of metallic aircraft parts, the mitigating includes protecting at least one aircraft from corrosive atmospheric conditions by covering, moving to a climate-controlled hangar, applying anticorrosive paint, etc.

Referring to Task (i) Option 501 and FIG. 6, in some cases, the computerized generative reasoner includes a generator 601 and a discriminator 603, and producing the plurality of provable conjectures applicable to the physical (or other scientific) problem, based on the input to the computerized generative reasoner, includes the generator generating embeddings of a new theorem using machine learning; and the discriminator maximizing a probability of truth of the new theorem.

Note that, in general, the output of ML is not necessarily provable, such that in general, the new theorem may or may not include one of the provable conjectures. It is possible, for example, to keep outputting until a provable conjecture is obtained; provability is desirable. Thus, in one or more embodiments, the new theorem includes one of the provable conjectures. The observations of this paragraph are generally applicable to Task (i) option 501, Task (ii) option 503, task (iii) option 505, and Task (iv) option 507.

Referring to Task (ii) Option 503 and FIG. 7, in some cases, the computerized generative reasoner includes a generator 701 and a pre-trained discriminator 703, and producing the plurality of provable conjectures applicable to the physical (or other scientific) problem, based on the input to the computerized generative reasoner, includes the generator generating embeddings of a new theorem using machine learning; and the discriminator maximizing a probability of truth of the new theorem and providing same as a reward to the generator. As noted, in some such cases, the new theorem includes one of the provable conjectures.

Referring to Task (iii) Option 505, in some cases, producing the plurality of provable conjectures applicable to the physical (or other scientific) problem, based on the input to the computerized generative reasoner, includes training on a sequence of axioms including a proof of a theorem to be generated, to obtain the proof, and a final step of the proof includes the new theorem. As noted, in some such cases, the new theorem includes one of the provable conjectures.

Figure 8:
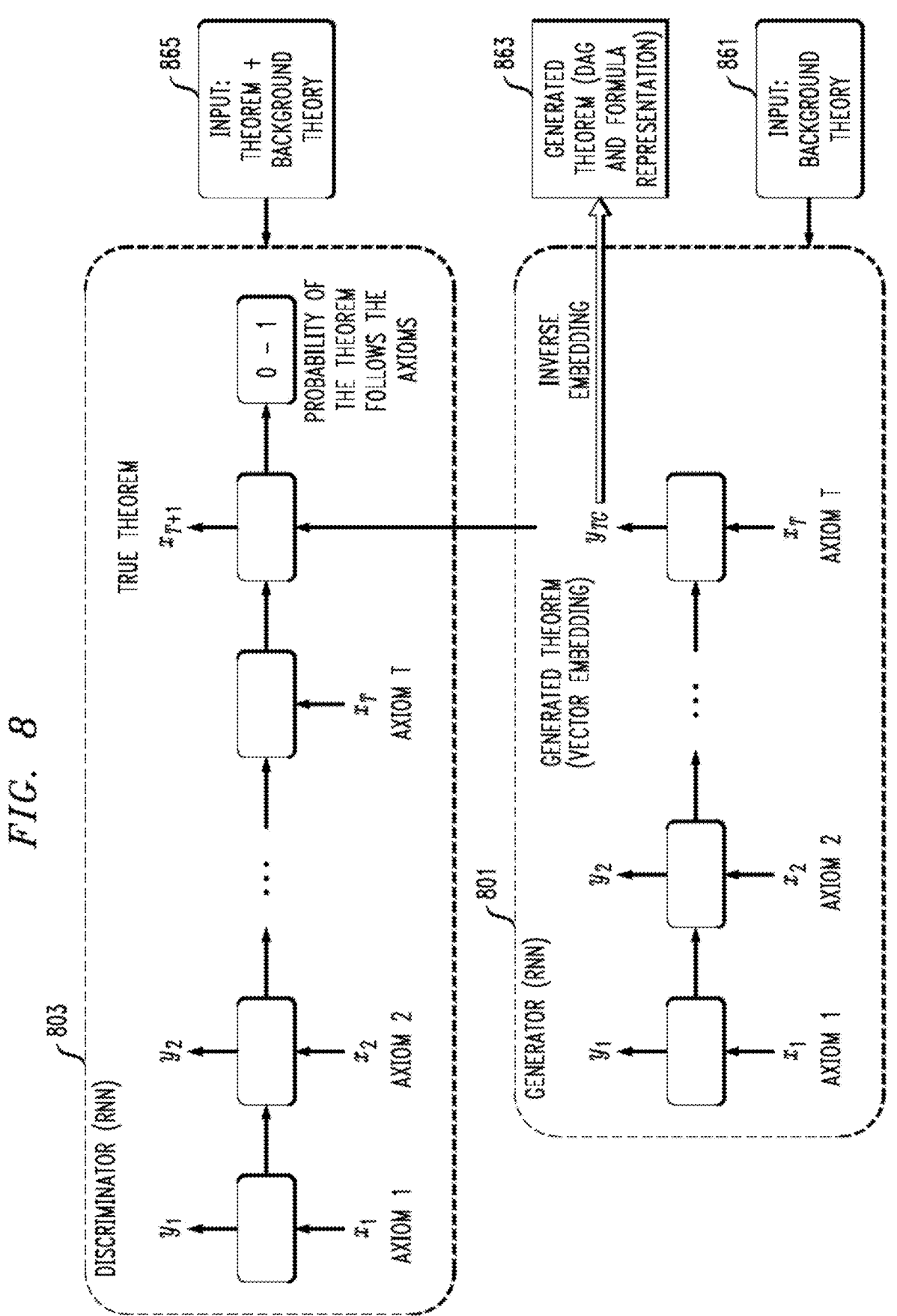
FIG. 8 shows specifics of generating a theorem as a continuation of a partially ordered sequence of axioms, according to an aspect of the invention.

Referring to Task (iv) Option 507 and FIG. 8, in some cases, the computerized generative reasoner includes a generator 801 and a discriminator 803, each implementing a recurrent neural network model, and producing the plurality of provable conjectures applicable to the physical (or other scientific) problem, based on the input to the computerized generative reasoner, includes: the generator taking a sequence of axioms at a plurality of time steps as an input with an output at a last of the time steps including an embedding of a new theorem; and the discriminator taking the sequence of axioms and the new theorem as an input and outputting a probability of the new theorem following the sequence. As noted, in some such cases, the new theorem includes one of the provable conjectures.

In another aspect, an exemplary apparatus includes a memory (e.g. 30); a non-transitory computer readable medium (e.g. 34) including computer executable instructions; and at least one processor 16, coupled to the memory and the non-transitory computer readable medium, and operative to execute the instructions to be operative to instantiate a computerized generative reasoner, a computerized model inference engine, and a computerized prediction module; provide a background theory applicable to a scientific problem as input to the computerized generative reasoner; with the computerized generative reasoner, produce a plurality of provable conjectures applicable to the scientific problem, based on the input to the computerized generative reasoner; provide the plurality of provable conjectures and a set of input training data to the computerized model inference engine; with the computerized model inference engine, fit the input training data to the plurality of provable conjectures to obtain at least one candidate symbolic model reflecting scientific laws associated with the scientific problem; reduce a search space of a computerized prediction module by providing to the computerized prediction module the at least one candidate symbolic model; provide to the computerized prediction module new data; and with the computerized prediction module, search in the reduced search space to make a prediction related to the scientific problem based on the new data and the at least one candidate symbolic model.

One or more embodiments of the invention, or elements thereof, can be implemented in the form of an apparatus including a memory and at least one processor that is coupled to the memory and operative to perform exemplary method steps. FIG. 15 depicts a computer system that may be useful in implementing one or more aspects and/or elements of the invention, also representative of a cloud computing node according to an embodiment of the present invention. Referring now to FIG. 15, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/ server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/ non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 15, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 15) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. Consider, e.g., a cloud-based service 96 (or one or more elements thereof) to facilitate generative reasoning for scientific discovery, located in layer 90.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described (e.g. 305, 403, 405, 411, 415, 601, 611, 603, 615, 701, 703, 715, 801, 803). The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

providing a background theory applicable to a scientific problem as input to a computerized generative reasoner;

with said computerized generative reasoner, producing a plurality of provable conjectures applicable to said scientific problem, based on said input to said computerized generative reasoner;

providing said plurality of provable conjectures and a set of input training data to a computerized model inference engine;

with said computerized model inference engine, fitting said input training data to said plurality of provable conjectures to obtain at least one candidate symbolic model reflecting scientific laws associated with said scientific problem;

reducing a search space of a computerized prediction module by providing to said computerized prediction module said at least one candidate symbolic model, wherein the reducing of the search space uses a combination of: constraints, a grammar to restrict the search space to grammatically well-formed formulas, and a restriction of the search space to only derivable formulas;

providing to said computerized prediction module new data;

with said computerized prediction module, searching in said reduced search space to make a prediction related to said scientific problem based on said new data and said at least one candidate symbolic model; and mitigating a physical system subject to a physical problem based on said at least one candidate symbolic model, wherein said scientific problem comprises said physical problem.

2. The method of claim 1, further comprising repeating said step of fitting said input training data until said at least one candidate symbolic model satisfies an information condition.

3. The method of claim 1, wherein said physical problem comprises corrosion of metallic aircraft parts, wherein said mitigating comprises protecting at least one aircraft from corrosive atmospheric conditions, and further comprising:

collecting data based on a designed experiment related to the corrosion of the metallic aircraft parts;

generating a set of suitable formulas from a set of axioms known about physics related to the corrosion of the metallic aircraft parts;

finding the candidate symbolic model, wherein the candidate symbolic model minimizes an error by fitting the collected data into the generated set of suitable formulas; and estimating a start of a corrosion process based on the candidate symbolic model and atmospheric conditions.

4. The method of claim 1, wherein said computerized generative reasoner comprises a generator and a discriminator, and wherein producing said plurality of provable conjectures applicable to said physical problem, based on said input to said computerized generative reasoner, comprises:

said generator generating embeddings of a new theorem in a vector space using machine learning; and said discriminator maximizing a probability of truth of said new theorem.

5. The method of claim 4, wherein said new theorem comprises one of said provable conjectures.

6. The method of claim 1, wherein said computerized generative reasoner comprises a generator and a pre-trained discriminator, and wherein producing said plurality of provable conjectures applicable to said physical problem, based on said input to said computerized generative reasoner, comprises:

said generator generating embeddings of a new theorem in a vector space using machine learning; and said discriminator maximizing a probability of truth of said new theorem and providing the said maximized probability of truth of said new theorem as a reward to said generator.

7. The method of claim 6, wherein said new theorem comprises one of said provable conjectures.

8. The method of claim 1, wherein producing said plurality of provable conjectures applicable to said physical problem, based on said input to said computerized generative reasoner, comprises training on a sequence of axioms comprising a proof of a theorem to be generated, to obtain said proof, a final step of said proof comprising a new theorem.

9. The method of claim 8, wherein said new theorem comprises one of said provable conjectures.

10. The method of claim 1, wherein said computerized generative reasoner comprises a generator and a discriminator, each implementing a recurrent neural network model, and wherein producing said plurality of provable conjectures applicable to said physical problem, based on said input to said computerized generative reasoner, comprises:

said generator taking a sequence of axioms at a plurality of time steps as an input with an output at a last of said time steps comprising an embedding of a new theorem; and said discriminator taking said sequence of axioms and said new theorem as an input and outputting a probability of said new theorem following said sequence.

11. The method of claim 10, wherein said new theorem comprises one of said provable conjectures.

12. The method of claim 1, wherein the grammatically well-formed formulas are grammatically correct formulas.

13. An apparatus comprising:

a memory;

a non-transitory computer readable medium comprising computer executable instructions; and at least one processor, coupled to said memory and said non-transitory computer readable medium, and operative to execute said instructions to be operative to:

instantiate a computerized generative reasoner, a computerized model inference engine, and a computerized prediction module;

provide a background theory applicable to a scientific problem as input to said computerized generative reasoner;

with said computerized generative reasoner, produce a plurality of provable conjectures applicable to said scientific problem, based on said input to said computerized generative reasoner;

provide said plurality of provable conjectures and a set of input training data to said computerized model inference engine;

with said computerized model inference engine, fit said input training data to said plurality of provable conjectures to obtain at least one candidate symbolic model reflecting scientific laws associated with said scientific problem;

reduce a search space of a computerized prediction module by providing to said computerized prediction module said at least one candidate symbolic model, wherein the reducing of the search space uses a combination of: constraints, a grammar to restrict the search space to grammatically well-formed formulas, and a restriction of the search space to only derivable formulas;

provide to said computerized prediction module new data;

with said computerized prediction module, search in said reduced search space to make a prediction related to said scientific problem based on said new data and said at least one candidate symbolic model; and mitigate a physical system subject to a physical problem based on said at least one candidate symbolic model, wherein said scientific problem comprises said physical problem.

14. The apparatus of claim 13, wherein said at least one processor is further operative to execute said instructions to be operative to repeat said step of fitting said input training data until said at least one candidate symbolic model satisfies an information condition.

15. The apparatus of claim 14, wherein said computerized generative reasoner comprises a generator and a discriminator, and wherein producing said plurality of provable conjectures applicable to said scientific problem, based on said input to said computerized generative reasoner, comprises:

said generator generating embeddings of a new theorem in a vector space using machine learning; and said discriminator maximizing a probability of truth of said new theorem.

16. The apparatus of claim 14, wherein said computerized generative reasoner comprises a generator and a pre-trained discriminator, and wherein producing said plurality of provable conjectures applicable to said scientific problem, based on said input to said computerized generative reasoner, comprises:

said generator generating embeddings of a new theorem in a vector space using machine learning; and said discriminator maximizing a probability of truth of said new theorem and providing the said maximized probability of truth of said new theorem as a reward to said generator.

17. The apparatus of claim 14, wherein producing said plurality of provable conjectures applicable to said scientific problem, based on said input to said computerized generative reasoner, comprises training on a sequence of axioms comprising a proof of a theorem to be generated, to obtain said proof, a final step of said proof comprising a new theorem.

18. The apparatus of claim 14, wherein said computerized generative reasoner comprises a generator and a discriminator, each implementing a recurrent neural network model, and wherein producing said plurality of provable conjectures applicable to said scientific problem, based on said input to said computerized generative reasoner, comprises:

said generator taking a sequence of axioms at a plurality of time steps as an input with an output at a last of said time steps comprising an embedding of a new theorem; and said discriminator taking said sequence of axioms and said new theorem as an input and outputting a probability of said new theorem following said sequence.

19. A non-transitory computer readable medium comprising computer executable instructions which when executed by a computer cause the computer to perform a method of:

instantiating a computerized generative reasoner, a computerized model inference engine, and a computerized prediction module;

providing a background theory applicable to a scientific problem as input to said computerized generative reasoner;

with said computerized generative reasoner, producing a plurality of provable conjectures applicable to said scientific problem, based on said input to said computerized generative reasoner;

providing said plurality of provable conjectures and a set of input training data to said computerized model inference engine;

with said computerized model inference engine, fitting said input training data to said plurality of provable conjectures to obtain at least one candidate symbolic model reflecting scientific laws associated with said scientific problem;

reducing a search space of said computerized prediction module by providing to said computerized prediction module said at least one candidate symbolic model, wherein the reducing of the search space uses a combination of: constraints, a grammar to restrict the search space to grammatically well-formed formulas, and a restriction of the search space to only derivable formulas;

providing to said computerized prediction module new data;

with said computerized prediction module, searching in said reduced search space to make a prediction related to said scientific problem based on said new data and said at least one candidate symbolic model; and mitigating a physical system subject to a physical problem based on said at least one candidate symbolic model, wherein said scientific problem comprises said physical problem.

* * * * *